(12) United States Patent
Jen

(10) Patent No.: US 12,001,100 B1
(45) Date of Patent: Jun. 4, 2024

(54) MOBILE DISPLAY

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventor: Chen-Ming Jen, Miaoli (TW)

(73) Assignees: INTERFACE TECHNOLOGY (CHENGDU) CO., LTD., Chengdu (CN); INTERFACE OPTOELECTRONICS (SHENZHEN) CO., LTD., Shenzhen (CN); GENERAL INTERFACE SOLUTION LIMITED, Mioli County (TW)

( * ) Notice: Subject to any disclaimer, the term of this patent is extended or adjusted under 35 U.S.C. 154(b) by 0 days.

(21) Appl. No.: 18/239,249

(22) Filed: Aug. 29, 2023

(30) Foreign Application Priority Data

Jul. 27, 2023 (CN) .......................... 202310938730.5

(51) Int. Cl.
*G02F 1/13357* (2006.01)
*G02F 1/1333* (2006.01)
*G02F 1/1335* (2006.01)

(52) U.S. Cl.
CPC .... *G02F 1/133611* (2013.01); *G02F 1/13338* (2013.01); *G02F 1/133514* (2013.01); *G02F 1/133528* (2013.01); *G02F 1/133603* (2013.01)

(58) Field of Classification Search
CPC ........... G02F 1/13338; G02F 1/133528; G02F 1/133531; G02F 1/1335; G02F 1/133502; G02F 1/133553; G06F 3/03547; G06K 9/00; B29D 11/00644; B32B 2307/42; G02B 5/3025; G02B 6/0053; G02B 5/0231; G02B 5/0263

See application file for complete search history.

(56) References Cited

U.S. PATENT DOCUMENTS

| | | | |
|---|---|---|---|
| 2014/0183342 A1* | 7/2014 | Shedletsky | H10K 59/13 250/215 |
| 2015/0131035 A1* | 5/2015 | Chen | G02F 1/133533 427/163.1 |
| 2017/0251137 A1* | 8/2017 | Evans, V | G02F 1/1368 |
| 2018/0157110 A1* | 6/2018 | Park | G02F 1/13338 |

(Continued)

*Primary Examiner* — Jonathan Y Jung
(74) *Attorney, Agent, or Firm* — Locke Lord LLP; Tim Tingkang Xia, Esq.

(57) ABSTRACT

A mobile display includes: a first substrate, having an optical stack that is located on an upper surface of the first substrate and has an anti-glare layer and a non-apertured polarizing layer; a display stack, having a color filtering layer and a liquid crystal layer, wherein the display stack is located on a lower surface of the first substrate, and the color filtering layer has a plurality of openings; and a second substrate, having an upper surface in contact with the display stack, and having a lower surface that is provided with a plurality of infrared ink structures; wherein the openings correspond to an image module, an infrared module, an LED module, and an ambient light sensor, respectively, and the non-apertured polarizing layer covers the openings while the anti-glare layer does not cover a region in which the opening corresponding to the image module is located.

12 Claims, 6 Drawing Sheets

(56) References Cited

U.S. PATENT DOCUMENTS

2020/0117034 A1* 4/2020 Yin ..................... G06F 1/1643
2020/0124910 A1* 4/2020 Hwang ............. G02F 1/136209
2021/0141266 A1* 5/2021 Takimoto .......... G02F 1/133512
2023/0091694 A1* 3/2023 Lu .......................... G02B 1/11
 359/601

* cited by examiner

MOBILE DISPLAY

CROSS-REFERENCE TO RELATED APPLICATIONS

This application claims the priority benefit of China application serial no. 202310938730.5, filed on Jul. 27, 2023. The entirety of the above-mentioned patent application is hereby incorporated by reference herein and made a part of this specification.

BACKGROUND OF THE INVENTION

1. Technical Field

The present invention relates to a mobile display, and more particularly to a mobile display providing comfortable finger touch and having smooth surface without any unevenness or height difference.

2. Description of Related Art

Please refer to FIG. 1 for a perspective view of a conventional mobile display. As shown, during production of the conventional mobile display 100, in order to prevent adhesion of the cover glass A onto the color filter substrate 110 of the in-cell LCD module from degrading functions of the camera lens module 104, the infrared module 102, or the LED module and ambient light sensor (ALS) 106, the current strategy is to slot the region I of the polarizing film 108 at the front, or the screen surface, of the mobile display 100. However, use of this strategy unavoidably leads to height difference around the slot and in turn uneven screen surface that is adverse to both pleasing appearance and comfortable finger touch.

For better understanding of the foregoing height difference, please refer to FIG. 2, which is a cross-sectional view of the conventional mobile display. As shown, the mobile display 100 comprises a polarizing film 108, a color filter substrate 110, a color filtering layer 112, a liquid crystal layer 114, a touch layer 116, a TFT array substrate 118, an infrared ink structure 120, and encapsulant 124. The color filtering layer 112 is composed of a red photoresist R, a blue photoresist B, a green photoresist G, and black matrix BM existing between the adjacent photoresists. The encapsulant 124 hold the color filter substrate 110 and the TFT array substrate 118 together with the liquid crystal layer 114 located therebetween. The region I corresponds to the infrared ink structure 120 and is free of the polarizing film 108, for enhancing transmittance of light 122. As described previously, because the polarizing film 108 is slotted in the region I at the front, or the screen surface, of the mobile display 100, the height difference and the consequent unevenness lead to less pleasing appearance and less comfortable finger touch.

Hence, there is a need for a mobile display that addresses the shortcomings seen in the prior art.

SUMMARY OF THE INVENTION

In view of this, one aspect of the disclosure provides a mobile display, comprising: a first substrate, having an optical stack that is located on an upper surface of the first substrate and has an anti-glare layer and a non-apertured polarizing layer; a display stack, having a color filtering layer and a liquid crystal layer, wherein the display stack is located on a lower surface of the first substrate, and the color filtering layer has a plurality of openings; and a second substrate, having an upper surface in contact with the display stack, and having a lower surface provided with a plurality of infrared ink structures; wherein the openings correspond to an image module, an infrared module, an LED module, and an ambient light sensor, respectively, and the non-apertured polarizing layer covers the openings; and wherein the anti-glare layer does not cover a region in which the opening corresponding to the image module is located.

According to one or more implementations of the disclosure, the mobile display is an in-cell touch-screen display.

According to one or more implementations of the disclosure, the optical stack further comprises: an anti-reflection layer and an anti-smudge layer.

According to one or more implementations of the disclosure, further comprises a further polarizing layer, which is located on the lower surface of the second substrate and does not cover the openings corresponding to the image module, the infrared modules, the LED module, and the ambient light sensor.

According to one or more implementations of the disclosure, the second substrate is a TFT array substrate, and the infrared ink structures are located below a TFT array.

According to one or more implementations of the disclosure, the non-apertured polarizing layer has a transmittance of greater than 85% in a wavelength range of between 850 nm and 1000 nm.

According to one or more implementations of the disclosure, the non-apertured polarizing layer has a transmittance of between 40% and 50% in a wavelength range of between 450 nm and 650 nm.

According to one or more implementations of the disclosure, the non-apertured polarizing layer has a transmittance of T1 at a wavelength of 525 nm, and has a transmittance of T2 at a wavelength of 575 nm, in which a difference between the transmittance T1 and the transmittance T2 is smaller than 2%.

According to one or more implementations of the disclosure, the non-apertured polarizing layer has a pen hardness of 3H.

According to one or more implementations of the disclosure, further comprises a touch layer, wherein the touch layer is sandwiched between the display stack and the second substrate.

Another aspect of the disclosure provides a mobile display, comprising: a color filter substrate, having an optical stack and a color filtering layer, wherein the optical stack is located on an upper surface of the color filter substrate and has an anti-glare layer and a non-apertured first polarizing layer, while the color filtering layer is located on a lower surface of the color filter substrate and has a plurality of openings; a TFT array substrate, having an upper surface that is in a face-to-face configuration with the color filtering layer, and having a lower surface that is provided with a plurality of infrared ink structures, which are located below a TFT array; a liquid crystal layer, which is sandwiched between the color filter substrate and the TFT array substrate, and is in contact with the color filtering layer; and a second polarizing layer, which is located on the lower surface of the TFT array substrate and does not cover the openings corresponding to an image module, an infrared module, an LED module, and an ambient light sensor; wherein the openings correspond to the image module, the infrared module, the LED module, and the ambient light sensor, respectively, and the non-apertured first polarizing layer covers the openings; wherein the anti-glare layer does not cover a region in which the opening corresponding to the image module is located.

Still another aspect of the disclosure provides a mobile display, comprising: a color filter substrate, having an optical stack and a color filtering layer, wherein the optical stack is located on an upper surface of the color filter substrate and has an anti-glare layer and a non-apertured first polarizing layer, while the color filtering layer is located on a lower surface of the color filter substrate and has a plurality of openings; a TFT array substrate, having an upper surface that is in a face-to-face configuration with the color filtering layer, and having a lower surface that is provided with a plurality of infrared ink structures, which are located below a TFT array; a liquid crystal layer, which is sandwiched between the color filter substrate and the TFT array substrate, and is in contact with the color filtering layer; a touch layer, which is sandwiched between the liquid crystal layer and the TFT array substrate; and a second polarizing layer, which is located on the lower surface of the TFT array substrate and does not cover the openings corresponding to an image module, an infrared module, an LED module, and an ambient light sensor; wherein the openings correspond to the image module, the infrared modules, the LED module, and the ambient light sensor, respectively, and the non-apertured first polarizing layer covers the openings; wherein the anti-glare layer does not cover a region in which the opening corresponding to the image module is located; wherein the non-apertured polarizing layer has a pen hardness of 3H.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

Figure 1:
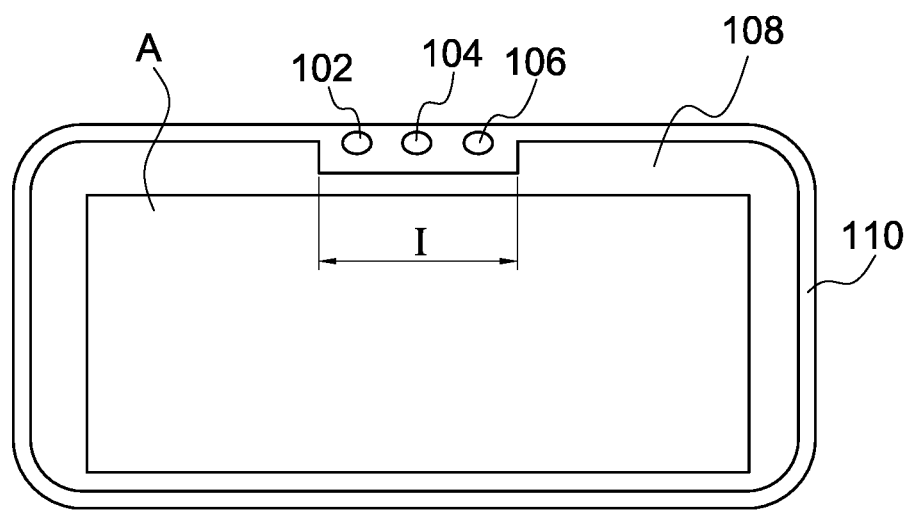
FIG. 1 is a perspective view of a conventional mobile display.
Figure 2:
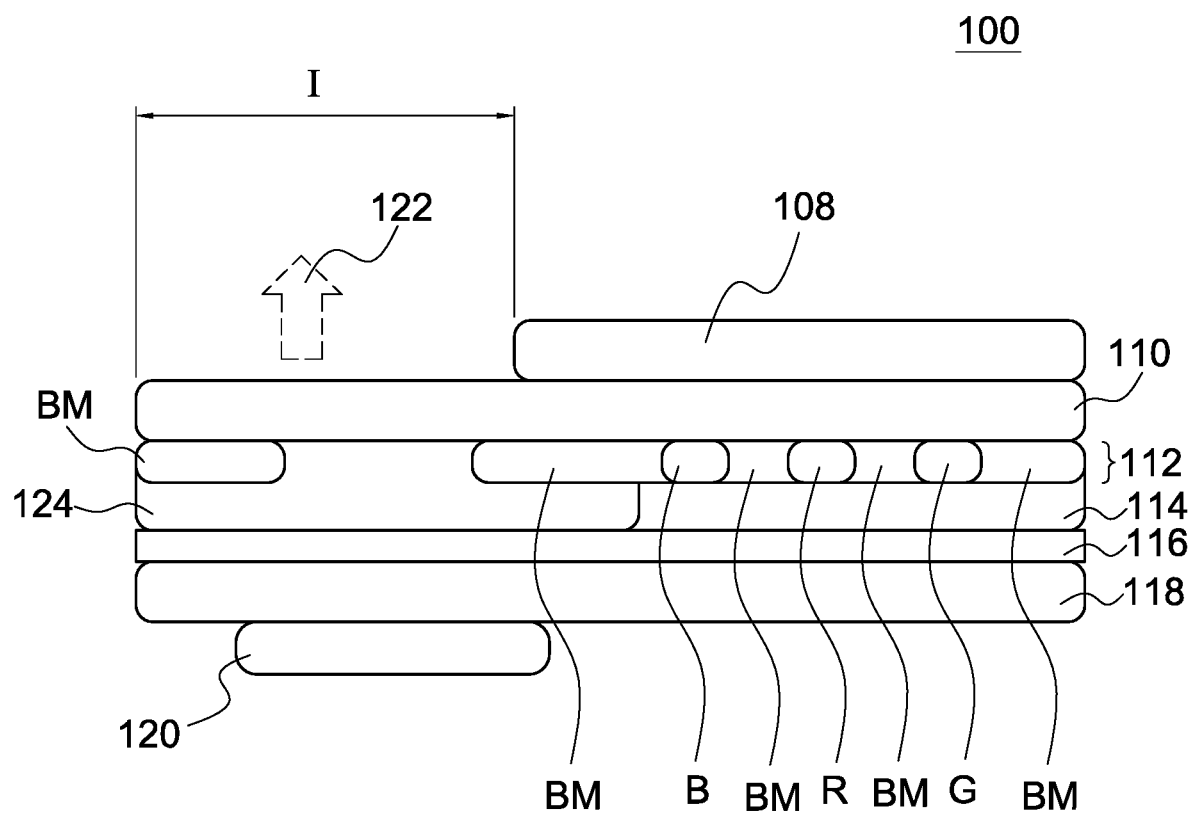
FIG. 2 is a cross-sectional view of the conventional mobile display.

The accompanying drawings are provided to show and illustrate various features and elements of the present invention in the optimal manner and need not to be made to exact scale. Similar yet not necessarily identical parts of different preferred embodiments may be indicated with the same reference numerals.

DETAILED DESCRIPTION OF THE INVENTION

To make the foregoing objectives, features, and advantages of the present invention clearer and more understandable, the following description will be directed to some embodiments as depicted in the accompanying drawings to detail the technical schemes disclosed in these embodiments.

The following embodiments or examples are designed to accentuate carious features of the subject matters depicted. Specific compositions and arrangements are selected herein for simplification of but not limitation to the disclosure. Although sizes and shapes of elements are subject to processing or required properties, these shall not be limited by any range or value recited herein. For example, while one or more cross-sectional views are provided to show the technical features of the present invention, these drawings are made to schematically depict ideal embodiments and not limiting. In practical implementations, discrepancy in terms of shape may raise due to manufacturing processes and/or tolerances.

Moreover, it is to be noted that spatial descriptions, such as "below," "under," "beneath," "on," "above," and so forth are for illustrating relations among the described elements or features only, and also apply as to use or operation of the relevant elements.

Briefly, the present invention addresses the problems of the prior-art devices about less pleasing appearance and less comfortable finger touch caused by unevenness and height difference on the screen surface by providing a mobile display that comprises a color filtering layer that has openings that correspond to an image module, infrared modules, an LED module, and an ambient light sensor, respectively; a non-apertured polarizing layer that is located outside a color filter substrate and covers the openings; an anti-glare layer that is located outside the color filter substrate and does not cover the region in which the opening corresponding to the image module is located, thereby addressing prior-art problems about less pleasing appearance and less comfortable finger touch due to height difference otherwise existing in the screen surface.

Some embodiments of the present invention will be descried with reference to the accompanying drawings.

Figure 3:
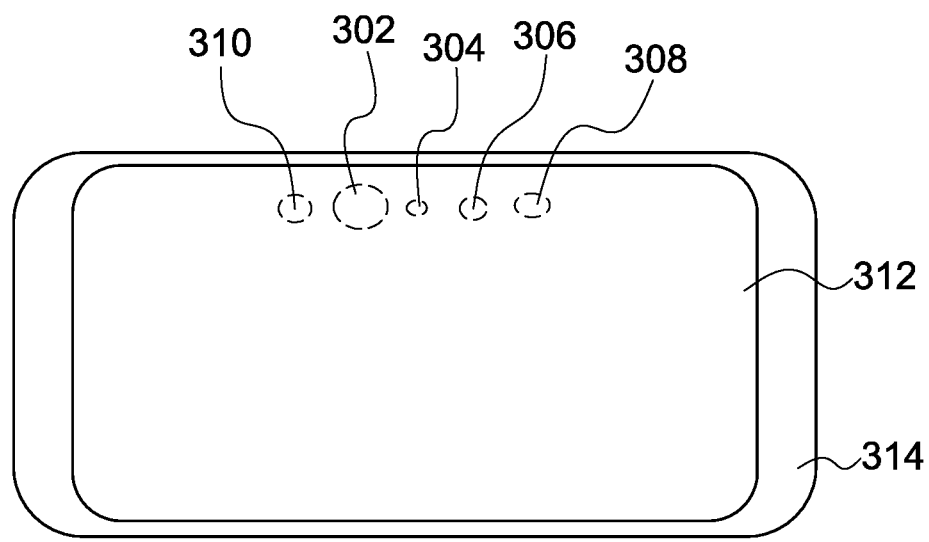
FIG. 3 is a perspective view of a mobile display according to one embodiment of the present invention.

First, please refer to FIG. 3 for a perspective view of a mobile display according to one embodiment of the present invention. As shown, in the present embodiment, the mobile display 300 comprises a polarizing layer 312 and an in-cell LCD module 314. The In-cell LCM 314 has openings corresponding to the infrared modules 308, 310, the camera lens module 302, the LED module 304, and the ambient light sensor 306. It is to be noted that the polarizing layer 312 is not apertured and covers the corresponding openings of the infrared modules 308, 310, the camera lens module 302, the LED module 304, and the ambient light sensor 306, as detailed below.

Figure 4:
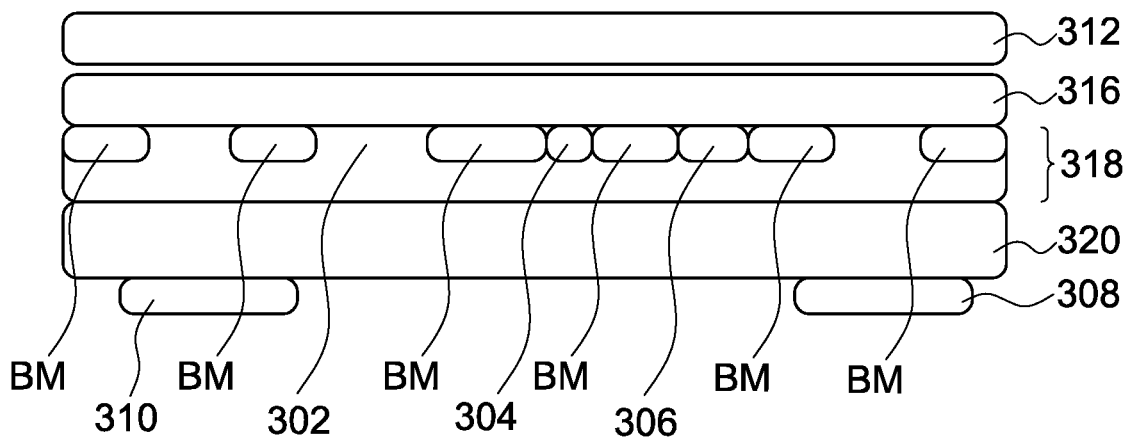
FIG. 4 is a cross-sectional view of the mobile display according to the embodiment of the present invention.

Then please refer to FIG. 4 for a cross-sectional view of a mobile display in an embodiment of the present invention. As shown, the mobile display 300 comprises: an optical stack 312, a first substrate 316, a display stack 318, a second substrate 320, and a plurality of infrared ink structures 308, 310. In the embodiment of the present invention, the mobile display 300 is an in-cell touch-screen display. In the embodiment of the present invention, the second substrate 320 is a TFT array substrate, and the infrared ink structures 308, 310 are located below the TFT array.

As shown in FIG. 4, the optical stack 312 is located on the upper surface of the first substrate 316 and comprises an anti-glare layer and a non-apertured polarizing layer. In another embodiment of the present invention, the optical stack 312 further comprises: an anti-reflection layer and an anti-smudge layer. In the embodiment of the present invention, the non-apertured polarizing layer in the optical stack 312 has a transmittance of greater than 85% in a wavelength range of between 850 nm and 1000 nm. In another embodiment of the present invention, the non-apertured polarizing layer in the optical stack 312 has a transmittance of between 40% and 50% in a wavelength range of between 450 nm and 650 nm. In still another embodiment of the present invention, the non-apertured polarizing layer in the optical stack 312 has a transmittance of T1 at a wavelength of 525 nm, and has a transmittance of T2 at a wavelength of 575 nm, in which a difference between the transmittance T1 and the transmittance T2 is smaller than 2%. Furthermore, in the embodiment of the present invention, the non-apertured polarizing layer in the optical stack 312 has a pen hardness of 3H.

As shown in FIG. 4, the display stack 318 comprises a color filtering layer that has a black matrix BM, openings 302, 304, 306, and a photoresist layer, and photoresist layer further comprises a liquid crystal layer, namely the part encircling the color filtering layer. The display stack 318 is located on the lower surface of the first substrate 316, and the color filtering layer has plural openings 302, 304, 306. The second substrate 320 has its upper surface in contact with the display stack 318, and has its lower surface provided with a plurality of infrared ink structures 308, 310. It is to be noted that the openings 302, 304, 306 correspond to the image module 302 (i.e., the camera lens module), the infrared modules 308, 310, the LED module 304, and the ambient light sensor 306 as shown in FIG. 3, respectively. The non-apertured polarizing layer in the optical stack 312 covers the openings. Additionally, it is to be noted that the anti-glare layer does not cover correspond to the region in which the image module 302 (i.e., the camera lens module) is located.

While this is not shown in FIG. 4, the mobile display 300 in an embodiment of the present invention may further comprise a further polarizing layer. The further polarizing layer is located on the lower surface of the second substrate 320 and does not cover the openings corresponding to the image module 302 (i.e., the camera lens module), the infrared modules 308, 310, the LED module 304, and the ambient light sensor 306.

Figure 5:
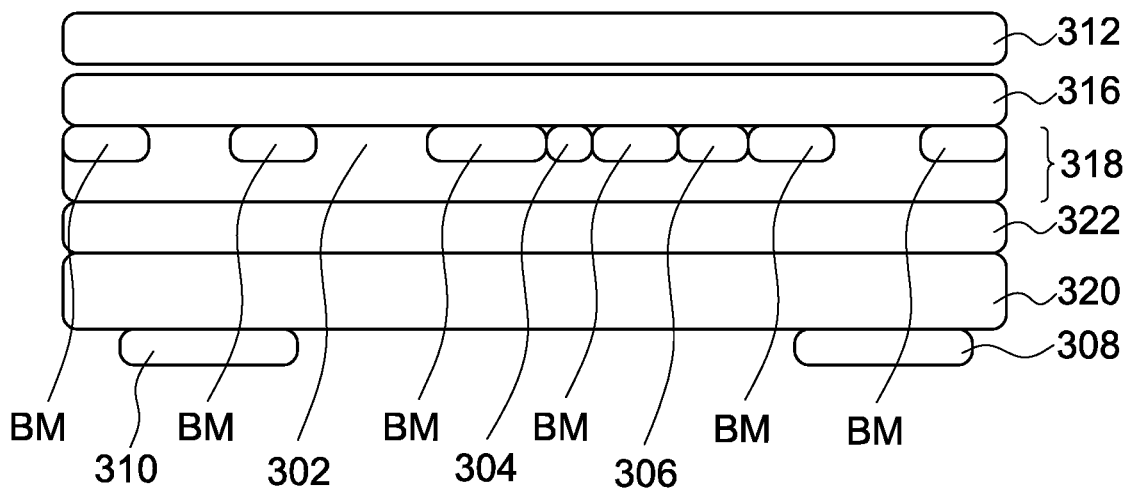
FIG. 5 is a cross-sectional view of a mobile display according to another embodiment of the present invention.

Now please refer to FIG. 5 for a cross-sectional view of a mobile display according to another embodiment of the present invention. As shown, the mobile display 400 is similar to the mobile display 300 depicted in FIG. 4, but further comprises a touch layer 322. The touch layer 322 is sandwiched between the display stack 318 and the second substrate 320. As other details are identical to those described with respect to FIG. 4, repeated description is omitted herein.

Figure 6:
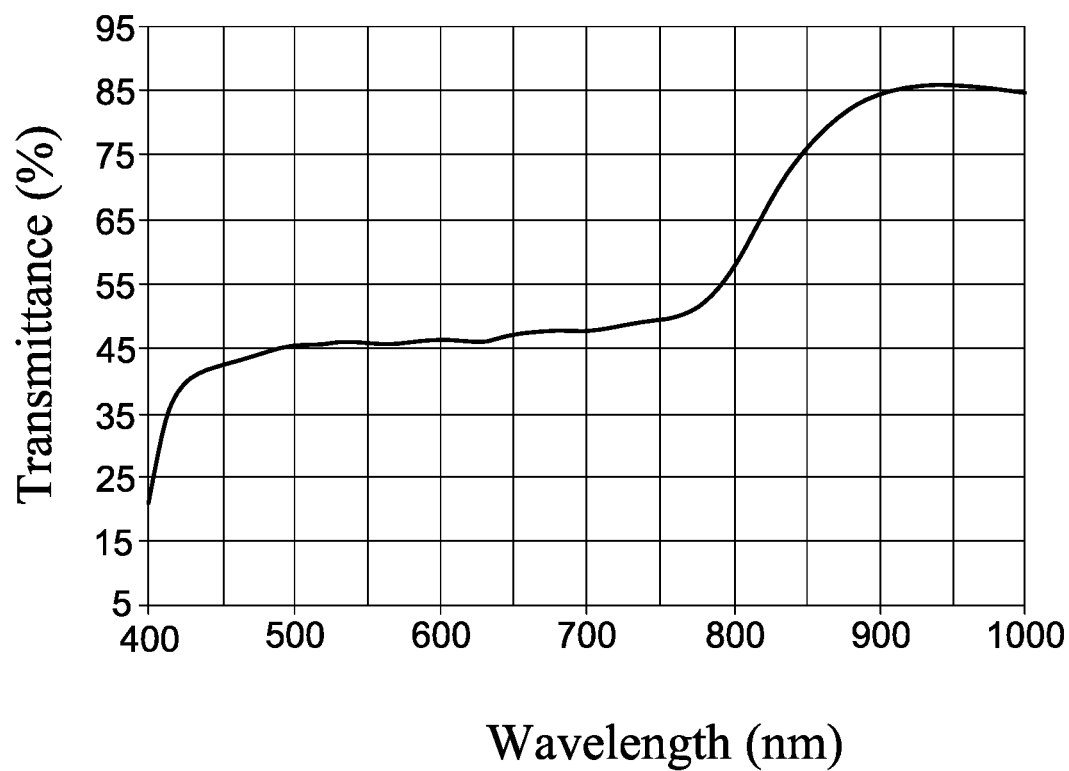
FIG. 6 graphically show the transmittance of the polarizing film in the mobile display of the present invention.

Moreover, please refer to FIG. 6 for transmittance with respect to the polarizing film in the mobile display according to an embodiment of the present invention. As shown, in the present embodiment, the non-apertured polarizing layer in the optical stack 312 has a transmittance of greater than 85% in a wavelength range of between 850 nm and 1000 nm and has a transmittance of between 40% and 50% in a wavelength range of between 450 nm and 650 nm. Additionally, the non-apertured polarizing layer in the optical stack 312 has a transmittance of T1 at a wavelength of 525 nm, and has a transmittance of T2 at a wavelength of 575 nm, in which a difference between the transmittance T1 and the transmittance T2 is smaller than 2%.

To sum up, in another aspect of the disclosure, the mobile display comprises: a color filter substrate, having an optical stack and a color filtering layer, wherein the optical stack is located on an upper surface of the color filter substrate and has an anti-glare layer and a non-apertured first polarizing layer, while the color filtering layer is located on a lower surface of the color filter substrate and has a plurality of openings; a TFT array substrate, having an upper surface that is in a face-to-face configuration with the color filtering layer, and having a lower surface that is provided with a plurality of infrared ink structures, which are located below a TFT array; a liquid crystal layer, sandwiched the color filter substrate and the TFT array substrate, and in contact with the color filtering layer; and a second polarizing layer, which is located on the lower surface of the TFT array substrate and does not cover the openings corresponding to an image module, an infrared modules, an LED module, and an ambient light sensor; wherein the openings correspond to the image module, infrared modules, the LED module, and the ambient light sensor, respectively, and the non-apertured first polarizing layer covers the openings; and wherein the anti-glare layer does not cover a region in which the opening corresponding to the image module is located.

In still another aspect of the disclosure, the mobile display comprises: a color filter substrate, having an optical stack and a color filtering layer, wherein the optical stack is located on an upper surface of the color filter substrate and has an anti-glare layer and a non-apertured first polarizing layer, while the color filtering layer is located on a lower surface of the color filter substrate and has a plurality of openings; a TFT array substrate, having an upper surface that is in a face-to-face configuration with the color filtering layer, and having a lower surface that is provided with a plurality of infrared ink structures, which are located below a TFT array; a liquid crystal layer, which is sandwiched between the color filter substrate and the TFT array substrate, and is in contact with the color filtering layer; a touch layer, which is sandwiched between the liquid crystal layer and the TFT array substrate; and a second polarizing layer, which is located on the lower surface of the TFT array substrate and does not cover the openings corresponding to an image module, an infrared modules, an LED module, and an ambient light sensor; wherein the openings correspond to the image module, the infrared module, the LED module, and the ambient light sensor, respectively, and the non-apertured first polarizing layer covers the openings; and wherein the anti-glare layer does not cover a region in which the opening corresponding to the image module is located; wherein the non-apertured polarizing layer has a pen hardness of 3H.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:
1. A mobile display, comprising:
a first substrate, having an optical stack that is located on an upper surface of the first substrate and has an anti-glare layer and a non-apertured polarizing layer;
a display stack, having a color filtering layer and a liquid crystal layer, wherein the display stack is located on a lower surface of the first substrate, and the color filtering layer has a plurality of openings; and
a second substrate, having an upper surface in contact with the display stack, and having a lower surface provided with a plurality of infrared ink structures;
wherein the openings correspond to an image module, an infrared module, an LED module, and an ambient light sensor, respectively, and the non-apertured polarizing layer covers the openings; and wherein the anti-glare layer does not cover a region in which the opening corresponding to the image module is located.

2. The mobile display of claim 1, wherein the mobile display is an in-cell touch-screen display.

3. The mobile display of claim 1, wherein the optical stack further comprises: an anti-reflection layer and an anti-smudge layer.

4. The mobile display of claim 1, further comprising a further polarizing layer, which is located on the lower surface of the second substrate and does not cover the openings corresponding to the image module, the infrared modules, the LED module, and the ambient light sensor.

5. The mobile display of claim 1, wherein the second substrate is a TFT array substrate, and the infrared ink structures are located below a TFT array of the TFT array substrate.

6. The mobile display of claim 1, wherein the non-apertured polarizing layer has a transmittance of greater than 85% in a wavelength range of between 850 nm and 1000 nm.

7. The mobile display of claim 1, wherein the non-apertured polarizing layer has a transmittance of between 40% and 50% in a wavelength range of between 450 nm and 650 nm.

8. The mobile display of claim 1, wherein the non-apertured polarizing layer has a transmittance of T1 at a wavelength of 525 nm, and has a transmittance of T2 at a wavelength of 575 nm, in which a difference between the transmittance T1 and the transmittance T2 is smaller than 2%.

9. The mobile display of claim 1, wherein the non-apertured polarizing layer has a pen hardness of 3H.

10. The mobile display of claim 1, further comprising a touch layer, wherein the touch layer is sandwiched between the display stack and the second substrate.

11. A mobile display, comprising:
a color filter substrate, having an optical stack and a color filtering layer, wherein the optical stack is located on an upper surface of the color filter substrate and has an anti-glare layer and a non-apertured first polarizing layer, while the color filtering layer is located on a lower surface of the color filter substrate and has a plurality of openings;
a TFT array substrate, having an upper surface that is in a face-to-face configuration with the color filtering layer, and having a lower surface that is provided with a plurality of infrared ink structures, which are located below a TFT array of the TFT array substrate;
a liquid crystal layer, which is sandwiched between the color filter substrate and the TFT array substrate, and is in contact with the color filtering layer; and
a second polarizing layer, which is located on the lower surface of the TFT array substrate and does not cover the openings corresponding to an image module, an infrared module, an LED module, and an ambient light sensor;
wherein the openings correspond to the image module, the infrared module, the LED module, and the ambient light sensor, respectively, and the non-apertured first polarizing layer covers the openings; and
wherein the anti-glare layer does not cover a region in which the opening corresponding to the image module is located.

12. A mobile display, comprising:
a color filter substrate, having an optical stack and a color filtering layer, wherein the optical stack is located on an upper surface of the color filter substrate and has an anti-glare layer and a non-apertured first polarizing layer, while the color filtering layer is located on a lower surface of the color filter substrate and has a plurality of openings;
a TFT array substrate, having an upper surface that is in a face-to-face configuration with the color filtering layer, and having a lower surface that is provided with a plurality of infrared ink structures, which are located below a TFT array of the TFT array substrate;
a liquid crystal layer, which is sandwiched between the color filter substrate and the TFT array substrate, and is in contact with the color filtering layer;
a touch layer, which is sandwiched between the liquid crystal layer and the TFT array substrate; and
a second polarizing layer, which is located on the lower surface of the TFT array substrate and does not cover the openings corresponding to an image module, an infrared module, an LED module, and an ambient light sensor,
wherein the openings correspond to the image module, the infrared module, the LED module, and the ambient light sensor, respectively, and the non-apertured first polarizing layer covers the openings;
wherein the anti-glare layer does not cover a region in which the opening corresponding to the image module is located; and
wherein the non-apertured polarizing layer has a pen hardness of 3H.

* * * * *